United States Patent [19]
Kronstorfer

[11] Patent Number: 5,619,895
[45] Date of Patent: Apr. 15, 1997

[54] TAILSTOCK FOR A LATHE PROVIDING HYDRAULIC AXIAL LENGTH COMPENSATION

[75] Inventor: Werner Kronstorfer, Oberstenfeld, Germany

[73] Assignee: Maschinenfabrik Ravensburg AG, Ravensburg, Germany

[21] Appl. No.: 555,375

[22] Filed: Nov. 9, 1995

Related U.S. Application Data

[63] Continuation of Ser. No. 126,719, Sep. 27, 1993, abandoned.

[30] Foreign Application Priority Data

Oct. 9, 1992 [DE] Germany ............... 42 34 049.7

[51] Int. Cl.$^6$ .................................. B23B 23/04
[52] U.S. Cl. ....................................... 82/148
[58] Field of Search ................................. 82/148

[56] References Cited

U.S. PATENT DOCUMENTS 3,292,467 12/1966 Heer .......................... 82/148
4,033,210 7/1977 Swenson ..................... 82/148

FOREIGN PATENT DOCUMENTS

| 242470 | 9/1965 | Austria. |
| 1252037 | 10/1967 | Germany. |
| 2462811C2 | 11/1982 | Germany. |
| 3721216 | 1/1989 | Germany ................ 82/148 |
| 3834473A1 | 4/1990 | Germany. |

Primary Examiner—M. Rachuba
Assistant Examiner—Kenneth J. Hansen
Attorney, Agent, or Firm—Spencer & Frank

[57] ABSTRACT

A tailstock for a lathe. The tailstock includes a housing, a rigid sleeve mounted in the housing and being both rotatable and axially displaceable with respect to the housing, a center integral with the sleeve and disposed at a front end of the sleeve for supporting the workpiece, and a spindle which can axially displace the sleeve in the housing. Hydrostatic radial bearings support the sleeve for axial and rotational displacement of the sleeve in the housing, the sleeve and the radial bearings being disposed relative to one another such that no additional structural components are interposed therebetween, the radial bearings thereby directly contacting the outer surface of the sleeve. In addition, a hydraulic system axially supports the sleeve for compensating for changes in an axial force applied by the workpiece to the sleeve thereby keeping the axial force constant.

13 Claims, 3 Drawing Sheets

TAILSTOCK FOR A LATHE PROVIDING HYDRAULIC AXIAL LENGTH COMPENSATION

This application is a continuation of application Ser. No. 08/126,719, filed Sep. 27, 1993 now abandoned.

BACKGROUND OF THE INVENTION

The invention relates to a tailstock for a lathe comprising a housing in which a sleeve is seated, the sleeve being axially displaceable by means of a spindle.

1. Prior Art

A tailstock is a centering and clamping device for the workpiece, which centering and clamping device is displaceable on and is to be clamped in place on the lathe bed. It serves, for example, as a counterstay during the turning of a workpiece. During drilling work on the lathe, it is used as a clamping device for the drilling tool. In the process, the drill feed is effected by axial displacement of a tailstock sleeve, which can be effected manually or mechanically. The tailstock sleeve is normally driven by means of a screw spindle actuated by a handwheel. The sleeve in known tailstocks is in principle only axially displaceable, rotation being prevented by slot and sliding piece. After the sleeve is displaced by means of the drive spindle, the latter is clamped, for example, by means of a hand lever.

To carry out the rotary movement of the workpiece, the lathe center or tailstock center inserted into the sleeve must be of rotatable construction, since the sleeve itself, accommodating the lathe center, performs no rotary movement. In the simplest case, the lathe center is therefore constructed so as to be rotatably mounted relative to its clamping shank.

In large machine tools, the lathe center or other tools are inserted into complicated intermediate mounting fixtures for holding or machining the workpiece, which intermediate mounting fixtures assume the pivot-bearing function between sleeve and, for example, lathe center. Since machines of this type work with very high axial forces, which, for example, can amount to 80 t, an elaborate bearing arrangement in a radial or axial direction of these intermediate housings is necessary in order to perform the rotary movement. On account of the play and tolerances associated therewith in the mountings, a number of disadvantages result.

2. Advantages of the Invention

The invention has considerable advantages over the known tailstock designs. On account of a greatly simplified design, a complicated construction with regard to a radial and axial bearing arrangement can be avoided.

SUMMARY OF THE INVENTION

The central objects of the invention is to provide a sleeve constructed not only as a longitudinally displaceable component but also as a rotating component. The sleeve can not only performance axial stroke displacement but at the same time performs the rotary movement for the tool to be inserted at the end, such as, for example, the lathe center.

A problem-free longitudinal displacement of the sleeve for positioning at the workpiece is achieved when the cylindrical component of the sleeve can be axially displaced in a hydrostatic radial bearing. Here, the sleeve is axially displaced and secured by a rear screw spindle.

Advantageous and convenient developments and improvements of the basic idea according to the invention are provided described further below.

Especially advantageous is the design of the axial supporting bearing as a hydrostatic axial bearing, the hydrostatic pressure of which constitutes a measure of the axial force on the tailstock. Here, the pressure of the hydrostatic axial bearing can serve as a control means for a further short-stroke axial bearing which serves as length compensation for the workpieces expanding due to heating.

Furthermore, the use of a hydraulic motor of low power is advantageous in order to carry out a coarse preadjustment of the axially displaceable sleeve relative to the workpiece by means of the screw spindle. A fine adjustment is then effected via the hydraulic pressure in a hydraulic short-stroke cylinder.

BRIEF DESCRIPTION OF THE DRAWINGS

Further particulars of the invention follow from the drawing and are described in more detail below with further advantages indicated. In the drawing.

DESCRIPTION OF THE INVENTION

Figure 1:
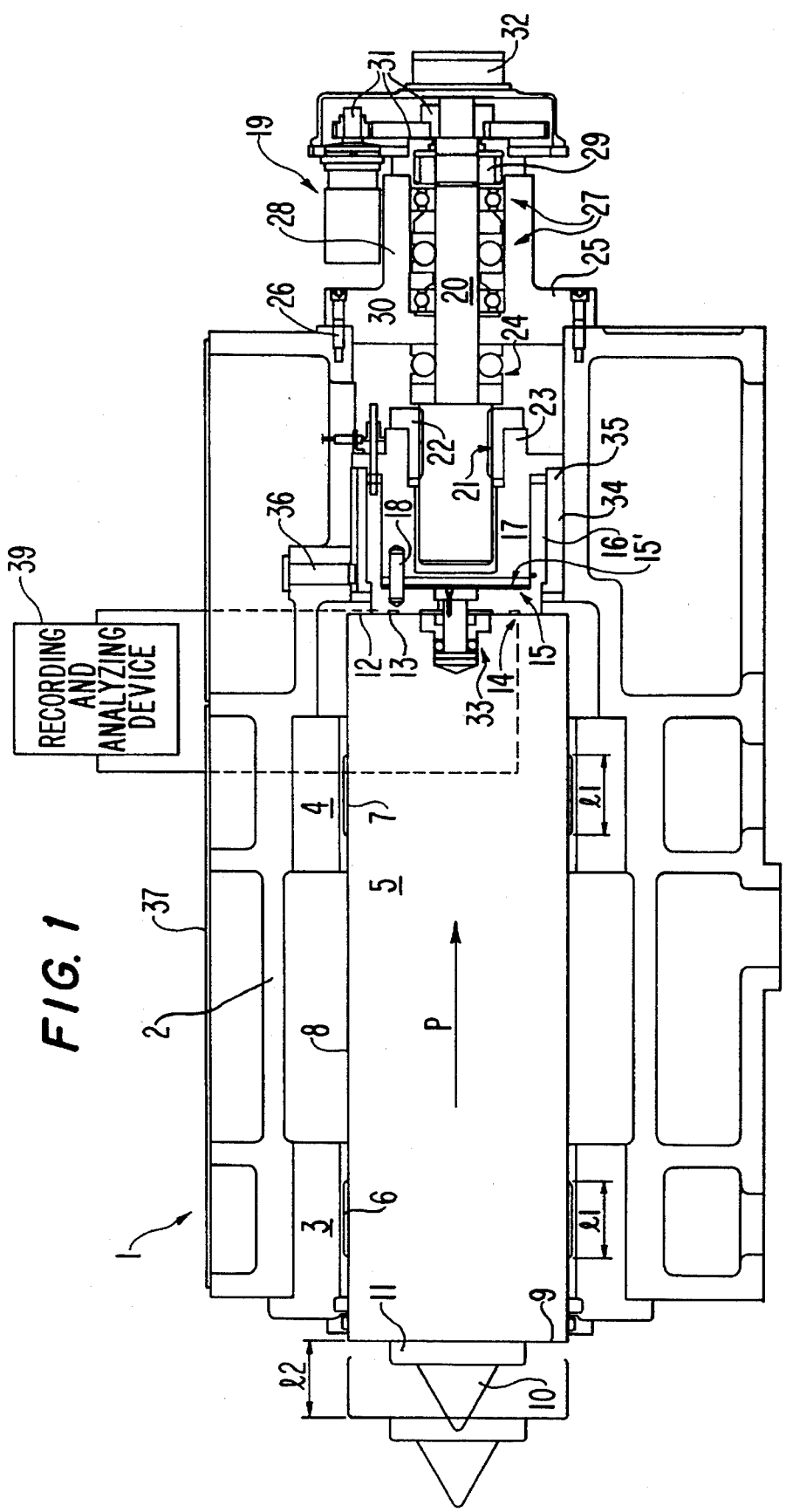
FIG. 1 shows a longitudinal section through a tailstock according to the invention.
Figure 2:
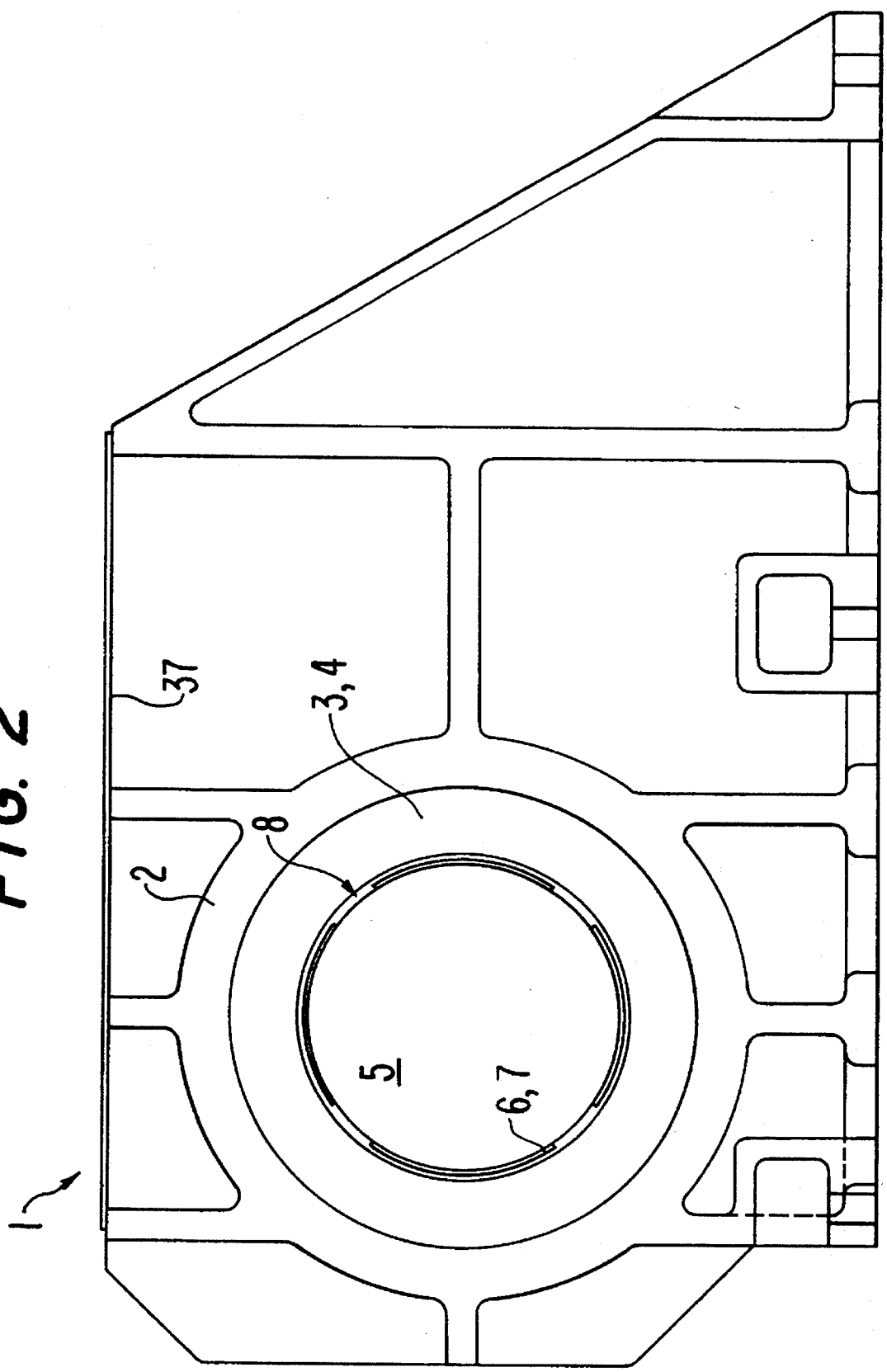
FIG. 2 shows an end view according to FIG. 1.
Figure 3:
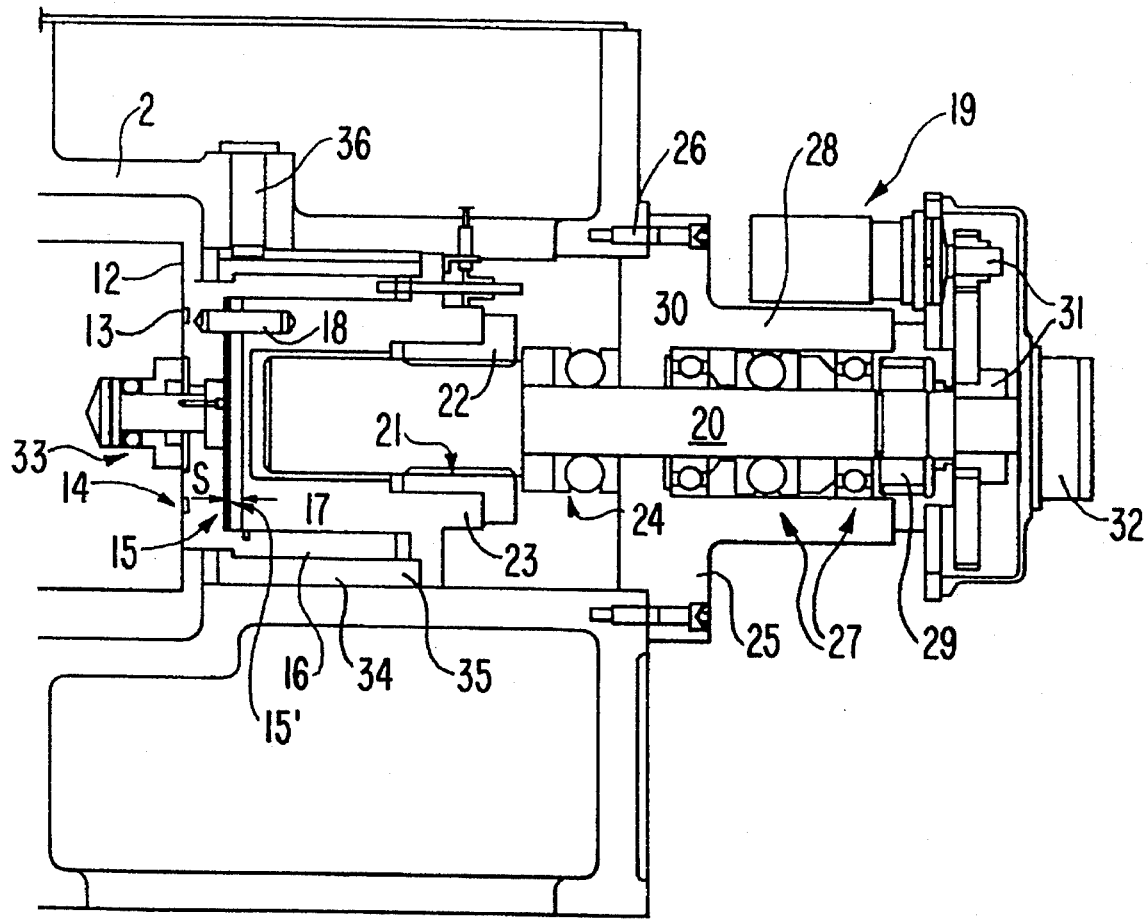
FIG. 3 shows an enlarged view of the rear portion of the tailstock of FIG. 1.

The tailstock 1 according to the invention consists of a robust cast housing 2 as shown in side view in FIGS. 1 and 3 and in end view in FIG. 2. Located in the cylindrical cast housing 2 are two bearing rings 3, 4 for the hydrostatic radial bearing arrangement of the rigid sleeve 5 which is designed so as to be rotatable and longitudinally displaceable. The bearing rings 3, 4 have hydraulic bearing pockets 6, 7 for the above purpose which bearing pockets extend over a length $l_1$. The sleeve 5 is designed as a rotationally cylindrical component having a smooth cylindrical lateral surface 8. The sleeve 5 is therefore displaceably mounted not only radially but also axially in the bearing rings 3, 4. The extent of the axial displacement is indicated in FIG. 1, for example, by $l_2$.

The rotatable and longitudinally displaceable sleeve 5 carries at its front end face 9 a tailstock center or lathe center 10 which, for example, is fastened to the sleeve 5 by a screw connection 11. The sleeve extends rigidly from the rear end to the front end thereof and is configured to axially immovably support center 10 at the front end thereof without the interposition of additional concentric sleeve components or joining elements such as bearings. The center is thus integral with the sleeve.

Located at the rear end 12 of the sleeve 5 is a hydrostatic axial bearing 13 having the hydrostatic bearing pocket 14. The hydraulic pressure in this bearing 13 builds up as a function of the axial loading P which acts on the sleeve 5. This bearing pressure constitutes an accurate measure of the axial force P and is not distorted by frictional or clamping forces.

Located behind the hydrostatic axial bearing 13 is a hydraulic short-stroke cylinder 15 which is formed from an outer, pot-shaped cylinder housing 16 and an inner, likewise pot-shaped piston 17 which form the cylinder space 15 with a stroke $s \approx \pm 5$ mm. Accordingly, the pot-shaped cylinder housing 16 forms at its side facing the sleeve 5 the hydrostatic axial bearing 13 and at its side remote from the sleeve 5 the hydraulic short-stroke cylinder 15, by means of which a length change in the workpiece during temperature changes or the like is compensated for. In the process, the hydraulic pressure in the short-stroke cylinder 15 is controlled by the hydrostatic bearing pressure in the hydrostatic axial bearing 13 which pressure can be recorded and analyzed by means of a recording and analyzing device 39 as a measure of the axial force P as shown in FIG. 1. The more the clamped tool heats up and expands, the greater becomes the pressure in the hydrostatic axial bearing 13, the bearing gap of which always stays approximately the same. Pressure compensation for these axial stresses takes place in the short-stroke cylinder 151, i.e. the stroke in the cylinder space 15 is correspondingly reduced. A distance s≈±5 mm is provided as a displacement for this. In this arrangement, two safety limit switches (not shown in more detail) monitor the correct position of the short-stroke cylinder 15 so that the full stroke of ±5 mm is available for the length compensation at the start of work.

Anti-rotation locking between the outer cylinder housing 16 and the inner piston 17 is performed by an anti-rotation locking pin 18.

The total stroke movement of the sleeve 5, which in the exemplary embodiment can be, for example, $l_2$=200 mm, is performed by means of a hydraulic motor 19 via a trapezoidal screw spindle 20 which acts on a nut 22 via the trapezoidal thread 21. The nut 22 is connected to the pot-shaped, inner piston 17 of the short-stroke cylinder 15 via a screw connection 23. An axial displacement of the nut 22 and thus a displacement of the piston 17 is therefore effected by turning the screw spindle 20. The axial displacement is transmitted via the short-stroke cylinder 15 to the outer pot-shaped cylinder housing 16 and via the hydrostatic axial bearing 13 to the sleeve 5.

The bearing arrangement of the outer, pot-shaped cylinder housing 16 inside the tailstock housing 2 can be effected via an additional bearing bush 34 which is held in the tailstock housing 2 via a screw connection 35 and an anti-rotation locking pin 36.

The screw spindle 20 is supported via an axial anti-friction bearing 24 relative to the rear end shield 25 of the tailstock housing 2. The end shield 25 is connected to the tailstock housing 2 via a screw connection 26.

The radial bearing arrangement of the screw spindle 20 is effected via a multiple arrangement of radial anti-friction bearings 27 which are arranged in the pot-shaped housing 28 of the end shield 25. A rear closing nut 29 fixes the anti-friction bearings in the pot-shaped housing 24. A closing bearing cap 30 closes the rear of this bearing arrangement.

The hydraulic motor 19 is flange-mounted on the pot-shaped housing 28 of the rear end shield and is connected to the spindle 20 via a reduction gearing 31. In this arrangement, the hydraulic motor 19 is only controlled manually and not by machine control, in order to ensure that, even in the event of a more serious fault in the control system, a return movement of the tailstock sleeve is reliably prevented in order to prevent the workpiece from falling out.

Furthermore, a spring-pressure brake 32 is fitted for safety at the end of the hydraulic motor, which spring-pressure brake 32 safely holds the screw spindle 20 in place. In addition, as a further safety feature, the hydraulic motor is hydraulically locked when the spindle 20 is stopped.

Via the trapezoidal screw spindle 20, the hydraulic motor 19 only produces an axial force of about 20% of the requisite nominal force. With this relatively low axial force, the tailstock sleeve 5 moves toward the workpiece. When the tailstock sleeve 5 strikes the workpiece, the hydraulic motor 19 is "stalled" on account of its low power. The full nominal force on the workpiece is achieved and kept constant only by the pressure buildup in the short-stroke cylinder 15.

The return movement of the tailstock sleeve is also effected by the hydraulic motor 19 via the trapezoidal screw spindle 20, in the course of which a small axial bearing 33 at the rear end of the sleeve 5 pulls the latter to the rear.

The tailstock housing is closed on its top side by a housing lid 37.

Compared with tailstocks of conventional construction, the present invention therefore offers a number of advantages, which in particular lie in a considerably higher accuracy of concentric running and substantially increased rigidity. Furthermore, the bearing arrangement is free of wear, and achieving maximum accuracy. The bearing arrangement has a prolonged service life. Finally, the axial force is exactly maintained and is not distorted by friction losses.

These advantages are essentially achieved by the common bearing arrangement for the rotation and the axial movement of the corresponding tailstock parts and in particular of the sleeve 5. In this way, the accuracy and also the rigidity are in particular increased because the diameter of the sleeve and thus of the part to be moved axially is as large as the sleeve itself in conventional solutions, other rotary parts which impair the rigidity in particular being dispensed with. There are therefore no further anti-friction bearings, clamping sleeves and other sliding guides of the sleeve with clamping on one side. The accuracy becomes very high in particular because there are no longer any concentrically mounted parts whose concentricity errors add up to a cumulative concentricity error. The concentric running of the sleeve is determined solely by the very accurate hydrostatic bearing arrangement in the bearing rings 3, 4, the concentric running of which is clearly superior to that of an anti-friction bearing.

The invention is not restricted to the exemplary embodiment shown and described; on the contrary, it also comprises all configurations and developments by persons skilled in the art within the scope of the idea behind the invention.

I claim:

1. A tailstock for a lathe comprising:

a tailstock housing;

a rigid sleeve mounted in the housing and having outer surface, a rear end and a front end disposed opposite the rear end, the sleeve being both rotatable and axially displaceable with respect to the housing;

a center integral with the sleeve and disposed at the front end thereof for supporting a workpiece;

a spindle operatively connected to the sleeve and adapted to axially displace the sleeve in the housing;

hydrostatic radial bearing means supporting the sleeve for axial and rotational displacement of the sleeve in the housing, the sleeve and the radial bearing means being disposed relative to one another such that no additional structure components are interposed therebetween, the radial bearing means thereby directly contacting the outer surface of the sleeve, and hydraulic means axially supporting the sleeve for compensating for changes in an axial force applied by the workpiece to the sleeve due to a length change of the workpiece thereby keeping the axial force constant.

2. The tailstock according to claim 1, wherein the hydrostatic radial bearing means comprise at least two bearings rings arranged in the housing, the bearing rings having hydrostatic bearing pockets therein for radially and axially displaceably supporting the sleeve in the housing.

3. The tailstock according to claim 1, wherein the hydraulic means comprise a hydrostatic axial bearing disposed adjacent the rear end of the sleeve, the tailstock further comprising a recording and analyzing device operatively connected to the hydrostatic axial bearing for recording and analyzing a hydraulic pressure of the hydrostatic axial bearing as a measure of an axial force exerted by the rear end of the sleeve on the hydrostatic axial bearing as a result of the axial force applied by the workpiece to the sleeve.

4. The tailstock according to claim 3, and further including a hydraulic short-stroke cylinder disposed behind the hydrostatic axial bearing for compensating for length changes of the workpiece, the hydraulic short-stroke cylinder being responsive to the hydraulic pressure of the hydrostatic axial bearing.

5. The tailstock according to claim 4, wherein the hydraulic short-stroke cylinder performs an adjustable stroke movement of $s \approx \pm 5$ mm.

6. The tailstock according to claim 4, wherein the hydraulic short-stroke cylinder comprises an outer hollow cylindrical housing and a piston axially displaceably disposed within the hollow cylindrical housing, the tailstock further including:

a hydraulic motor operatively, connected to the sleeve; the spindle being operatively connected between the hydraulic motor and the sleeve for transmitting a movement of the hydraulic motor to the sleeve for effecting an axial stroke movement of the sleeve; and a spindle nut disposed for connecting the spindle to the piston.

7. The tailstock according to claim 4, wherein the axial force exerted by the rear end of the sleeve on the hydrostatic axial bearing is built-up and maintained by a pressure build-up in the hydraulic short-stroke cylinder.

8. The tailstock according to claim 1, and further including a hydraulic motor operatively connected to the sleeve; the spindle being operatively connected between the hydraulic motor and the sleeve for transmitting work performed by the hydraulic motor to the sleeve for effecting an axial stroke movement of the sleeve.

9. The tailstock according to claim 8, wherein the housing includes an end shield, the tailstock further including an axial bearing cooperating with the end shield for supporting the spindle on the end shield.

10. The tailstock according to claim 8, wherein the hydraulic motor is controlled only manually for safeguarding a mounting of the workpiece.

11. The tailstock according to claim 8, and wherein the spindle further includes an axial restoring bearing disposed at the rear end of the sleeve for transmitting work performed by the hydraulic motor to the sleeve for effecting a return movement of the sleeve.

12. The tailstock according to claim 1, wherein the spindle is a trapezoidal screw spindle.

13. The tailstock according to claim 1, wherein:

the sleeve is a cylindrical component having a cylindrical outer surface; and the hydrostatic radial bearings means comprise hydrostatic bearing pockets.

* * * * *